United States Patent [19]
Hedlund

[11] 3,981,635
[45] Sept. 21, 1976

[54] MATERIAL HANDLING SYSTEM
[75] Inventor: Junior M. Hedlund, Boyceville, Wis.
[73] Assignee: Hedlund Manufacturing Co., Inc., Boyceville, Wis.
[22] Filed: Feb. 28, 1975
[21] Appl. No.: 553,913

Related U.S. Application Data
[62] Division of Ser. No. 397,380, Sept. 14, 1973, Pat. No. 3,872,981.

[52] U.S. Cl. .............................. 417/551; 91/422; 92/177; 417/900
[51] Int. Cl.² .......................................... F04B 21/04
[58] Field of Search .................. 198/226; 214/16 R; 100/179; 417/551, 900; 91/422; 92/177

[56] References Cited
UNITED STATES PATENTS

| | | | |
|---|---|---|---|
| 346,720 | 8/1886 | Carlson | 92/177 X |
| 576,929 | 2/1897 | Wilcox | 417/551 |
| 1,893,246 | 1/1933 | Robertson et al. | 198/226 |
| 2,238,944 | 4/1941 | Muller et al. | 198/226 X |
| 3,022,736 | 2/1962 | Bowen | 92/177 X |
| 3,687,311 | 8/1972 | Nesseth | 198/226 X |

Primary Examiner—William L. Freeh
Assistant Examiner—Edward Look
Attorney, Agent, or Firm—Burd, Braddock & Bartz

[57] ABSTRACT

A pumping apparatus used to move manure from a collection chamber through a conduit into a storage or detention pond. The pumping apparatus has a flow-through piston reciprocated with a reversible hydraulic fluid motor. The piston has a pair of gates pivotally mounted about separate generally upright axes at the forward end of the piston to control one-way flow of manure through the piston. A reciprocator operates in conjunction with a pump to alternately supply fluid under pressure to opposite ends of the fluid motor and thereby reciprocate the piston.

26 Claims, 8 Drawing Figures

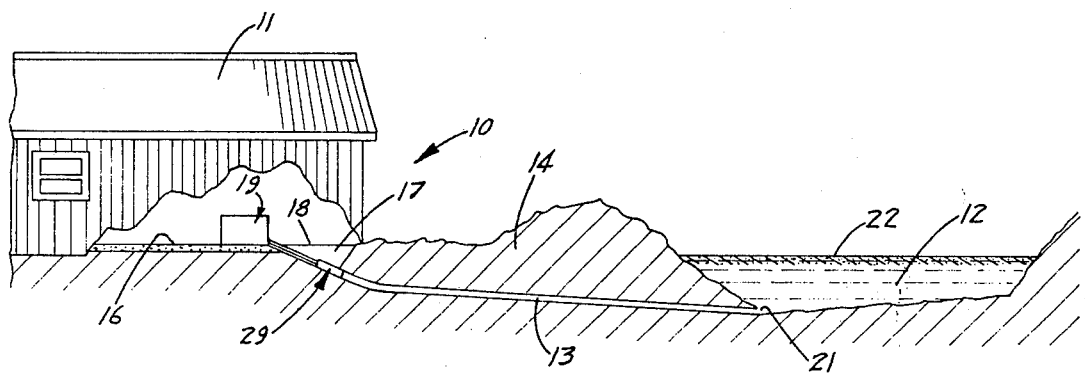
FIG_1
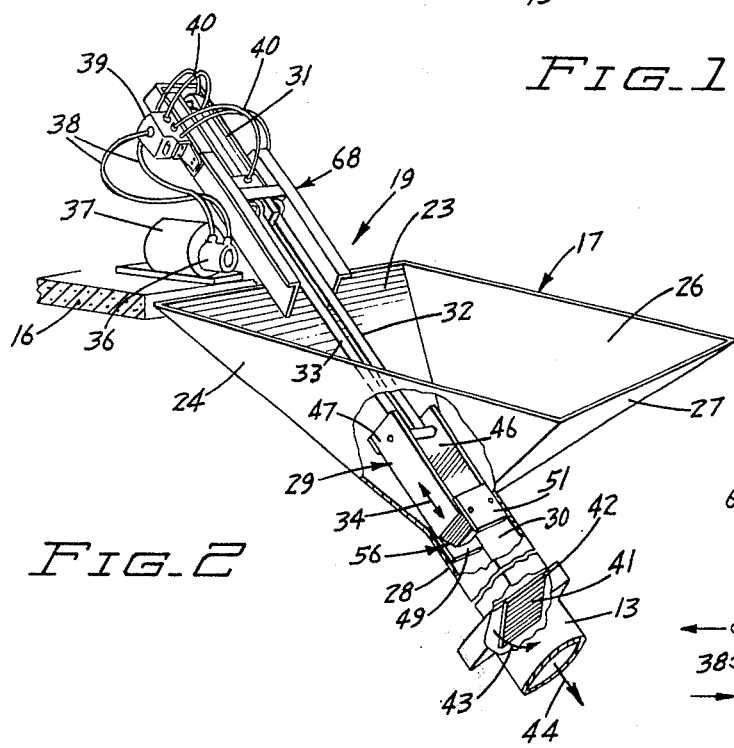
FIG_2
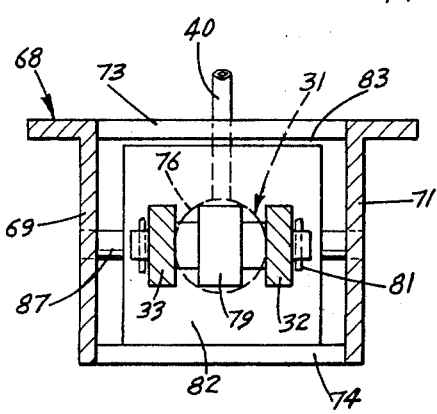
FIG_8
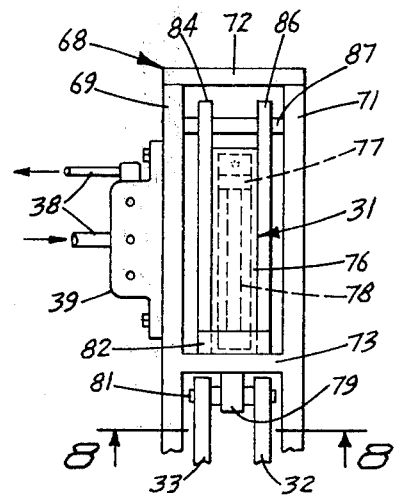
FIG_7

MATERIAL HANDLING SYSTEM

This application is a division of application Ser. No. 397,380 filed Sept. 14, 1973, now U.S. Pat. No. 3,872,981.

BACKGROUND OF INVENTION

There is adequate land area to completely recycle all of the animal manures produced. However, concentration of large volumes of manure from modern livestock production facilities, weather conditions, cropping systems and the need for efficient use of labor and other resources make it advisable for the agricultural manager to have a planned manure handling and storage system.

Animal wastes should not be applied to farm land under adverse soil or weather conditions except when planned methods will insure that they will remain on the land. The wastes should be stored in designed structures until they can be incorporated into the soil. The manure handling system should be designed to meet legal and market requirements, save the maximum amount of fertility in the manure, utilize labor efficiently, keep production costs down, and avoid objectional side effects including the control of flies, insuring safe water supplies and protecting products such as milk from absorbing manure odors.

Run-off control is a basic part of a manure handling system. It is an acute problem where livestock yard run-off could pollute streams, lakes or ground water. Structures, as diversions and storage or detention ponds, have been used to check run-off problems present in manure handling systems. It is recommended that a minimum of 150-180 days storage capacity in detention ponds is convenient for saving maximum fertility and preventing water pollution.

Schmitzer in U.S. Pat. No. 3,103,276 and Nesseth in U.S. Pat. No. 3,687,313 disclose manure handling apparatuses having pumps for moving manure through pipes leading to the bottom of a storage pond. This type of manure handling system is an effective means of handling manure, including liquid manure, with a minimum of labor and maximum of pollution control.

Materials, as concrete, clay and manure, have been conveyed through passages with pumps having flow-through pistons. Gates or valve structures associated with the pistons allow movement of the material through the piston in one direction and block the movement of material in the opposite direction whereby upon reciprocal movement of the piston the material is forced to move in one direction through the passage. Albricht et al in U.S. Pat. No. 1,370,506 disclose a pump having a single gate swingable about a generally horizontal axis for controlling the flow of material through a hollow piston. A similar structure is shown by Nesseth in U.S. Pat. No. 3,687,313. These pistons require relatively long strokes to close the gates and pump material. A plurality of gates pivotally mounted on a movable piston to control the flow of fluid through the piston are shown in U.S. Pat. Nos. 762,230; 1,248,118; and 2,238,944.

SUMMARY OF INVENTION

The invention is directed to a fluid material handling apparatus operable to pump fluid and semi-fluid materials through a passage to a desired location. More particularly, the invention is directed to a manure handling system having a pump operable to move manure, solid and liquid, from a hopper into a holding pond via a pipe. The manure pump has a flow-through piston which is reciprocated with a double-acting hydraulic cylinder or ram. The hydraulic cylinder is controlled with a means to automatically reverse the direction of movement of the movable part of the cylinder and thereby reciprocate the manure pumping piston. The manure pumping piston, located in the base section of the hopper, is operable to move manure from the hopper into a pipe leading to the bottom of a manure storage pond. The manure pumping piston has an open top and open forward and rear ends permitting the manure to flow through the piston. A pair of doors are pivotally mounted on the forward end of the piston for movement about separate generally upright axes. Pivot means located adjacent opposite sides of the piston attach the doors to the sides of the piston. The piston has a stop engageable by one of the doors when the doors are in the closed position. The other door rests on the first door, thereby closing the forward end of the piston. The double doors quickly close during the initial stage of the compression stroke of the piston, thereby providing the piston with a short stroke and maximum pumping efficiency to move manure through the passage of the pipe into the bottom of the storage pond. The doors swing about their separate axes to their open positions when the piston is retracted or reversed into the hopper. A one-way valve located downstream of the piston in the pipe prevents reverse movement of the manure in the pipe, whereby the manure can flow through the piston on the reverse stroke of the piston. The continuous reciprocating action of the pumping piston sequentially drives manure through the pipe into the bottom of the storage pond.

An object of the invention is to provide a manure handling system which has a hydraulic cylinder reciprocating a flow-through piston operable for maximum pollution control and storing the manure in a manner wherein the maximum fertility is retained. A further object of the invention is to provide a manure handling system that reduces odors and efficiently utilizes labor by permitting the manure to be spread at the proper time. Another object of the invention is to provide a manure handling apparatus which has a large capacity and is sturdy and construction and can be adapted to any type of barn cleaning methods. A still further object of the invention is to provide a manure handling pump which has a minimum of parts and is fast and clean in operation.

IN THE DRAWINGS:

FIG. 1 is a diagrammatic view of the material handling system of the invention in a cattle environment for moving manure from a barn into a holding area or pond;

FIG. 2 is a prospective view of the manure pumping apparatus used in the manure handling system of FIG. 1;

FIG. 7 is an enlarged top plan view of the hydraulic cylinder of the pumping apparatus of FIG. 2; and FIG. 8 is a sectional view taken along the line 8—8 of FIG. 7.

Figure 3:
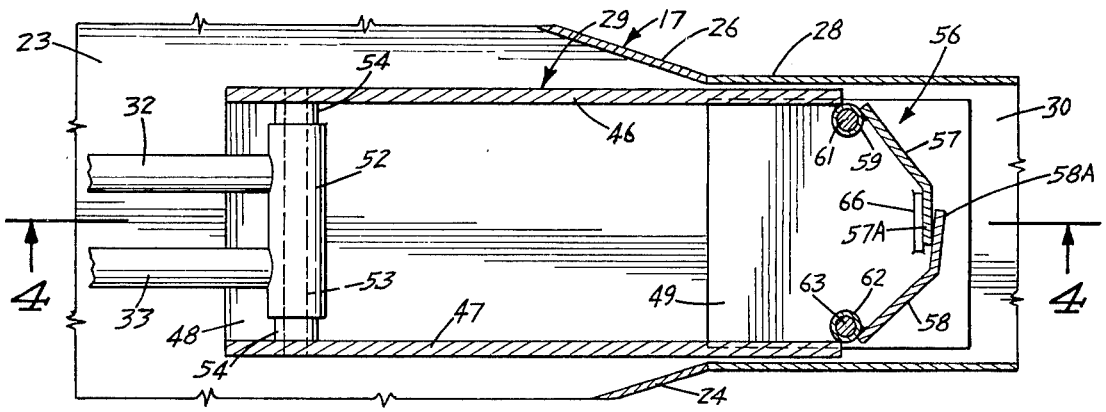
FIG. 3 is an enlarged longitudinal sectional view of the pumping piston in the apparatus of FIG. 2.

Referring to the drawing, there is shown in FIG. 1 the manure handling system of the invention indicated generally at 10 in a dairy cattle environment for handling the manure in a barn 11 and transferring the manure to a holding area or pond 12. The manure is moved through an underground pipe 13 leading from the barn 11 to the bottom of the holding pond 12. The pipe 13 is buried in the ground 14 below the frost level and is preferably a PVC pipe having a diameter of 12 inches. Other types of pipes or conduits can be used to convey the manure from the barn to the pond.

The barn 11 has a concrete floor 16 which collects the manure from the cattle. The manure on floor 16 is conveyed to a pit or hopper 17. Suitable conveying structures such as the free stall barn cleaner shown in U.S. Pat. application Ser. No. 255,404, now U.S. Pat. No. 3,872,981 can be used to move the manure into the hopper 17. Other types of cleaners, as endless chain gutter cleaners, can be used to move the manure into the hopper 18. The top of hopper 18 is closed with a grate 19 flush with the top of floor 16 to prevent the animals from falling into the hopper.

A manure pumping apparatus indicated generally at 19 is operable to remove the manure from the hopper 17 and force the manure through the pipe 13 to an outlet 21 at the bottom of the pond 12. The manure, both solid and liquid, forms a relatively hard top layer or crust 22 as the fresh manure is forced into the bottom of the pond. This method of management of the manure substantially reduces manure odors, flies and run-off. Pond 12 is of a size to accommodate 120–180 days supply of manure. This allows the farmer to remove the manure from the pond at a selected time in accordance with weather conditions, cropping systems and the available labor.

Referring to FIG. 2, hopper 17 has an inverted pyramidical shape with a downwardly and forwardly sloping bottom wall 23 joined to upwardly directed side walls 24 and 26. The side walls are connected to a front wall 27. All of the walls converge to a lower apex area having a downwardly inclined discharge tube 28. Tube 28 has a generally rectangular passageway leading to the passageway of the pipe 13. Tube 28 is a generally rectangular elongated cylinder having a square pumping chamber 30. A pumping piston indicated generally at 29 is operable with a fluid motor 31 to move into and out of the chamber 30 of cylinder 28. A pair of elongated rods 32 and 33 connect the fluid motor 31 with the piston 29 whereby the motor 31 reciprocates the piston 29 in the direction of arrow 34 into and out of chamber 30 of cylinder 28. The motor 31 is a double-acting hydraulic cylinder or ram having an elongated cylinder 76 carrying a reciprocating piston 77 and piston rod 78. Hydraulic fluid under pressure is supplied to motor 31 with a pump 36 driven with an electric motor 37. Lines 38 connect pump 36 with a reciprocating or reversing unit 39 operate to sequentially supply hydraulic fluid under pressure to opposite ends of the motor 31 via the line 40. Motor 31 and unit 39 can be a reciprocating motor Model 51915 made by Von Ruden Manufacturing Co. of Claremont, Minnesota.

Located adjacent the exit or outlet end of cylinder 28 is a generally upright valve member or plate 41 which acts as a check valve to prevent back flow of material in pipe 13. Valve member 41 has a generally horizontal pivot rod 42 pivotally mounted on portions of pipe 13 whereby the valve member 41 can move up and down in the direction of arrow 43 to function as a one-way valve. The reciprocating pumping piston 29 will move the material past the valve member 41 through the pipe 13 in the direction of arrow 44. The valve member 41 will move to a down or generally transverse position to prevent the reverse flow of material in the pipe 13.

Referring to FIGS. 3-6, there is shown the pumping piston 29 having a pair of generally upright side walls 46 and 47 attached to a rear bottom transverse member 48. The forward portions of the side walls 47 and 48 are attached to a bottom plate 49 and a top plate 51. The rear portion and the top of piston 29 are open to receive material from the hopper 17. Located between the side walls 46 and 47 is a transverse sleeve 52 secured to the forward ends of rods 32 and 33. A transverse pin 53 pivotally mounts the sleeve 52 on the rear portions of the side walls 46 and 47. Spacers 54 located on opposite sides of sleeve 52 position the sleeve on the pivot member or pin 53. Alternatively, rod 32 can be pivotally attached to the side wall 46 with a separate pivot member. In the same manner, rod 33 can be pivotally attached to side wall 47 with a pivot member, thereby providing the rear end of the piston with an unobstructed rear opening.

A double door means indicated generally at 56 is mounted on the forward end of the pumping piston 29 to control the flow of material through the piston. The double door means 56 comprises a first door 57 and a second door 58. Door 57 has an angularly disposed lip 57A at the outer portion thereof. In a similar manner, door 58 has an outwardly directed lip 58A. The door 57 is secured to a generally upright sleeve 59. An upright pivot pin 61 extended through sleeve 59 is secured to the plates 49 and 51 and thereby pivotally mount the door 57 for movement about a generally upright axis located adjacent the side wall 46. A second upright sleeve 62 is secured to door 58. A pivot pin 63 extends through sleeve 62 and is carried by plates 49 and 51 to pivotally mount door 58 about a generally upright axis located adjacent the side wall 47. Doors 57 and 58 are free to move relative to each other to open and closed positions. As shown in FIG. 3, the doors 57 and 58 are in their closed position, blocking the forward end of the pumping piston 29. When the doors 57 and 58 are in the closed position, the inner door 57 engages a pair of bars or stops 64 and 66 secured to the inside surfaces of plates 49 and 51. The doors 57 and 58, being free to move independent of each other, can be in the alternative overlapping position shown in FIG. 3. In other words, door 58 can engage the stops 64 and 66 with the door 57 overlapping the lip 58A.

Figure 4:
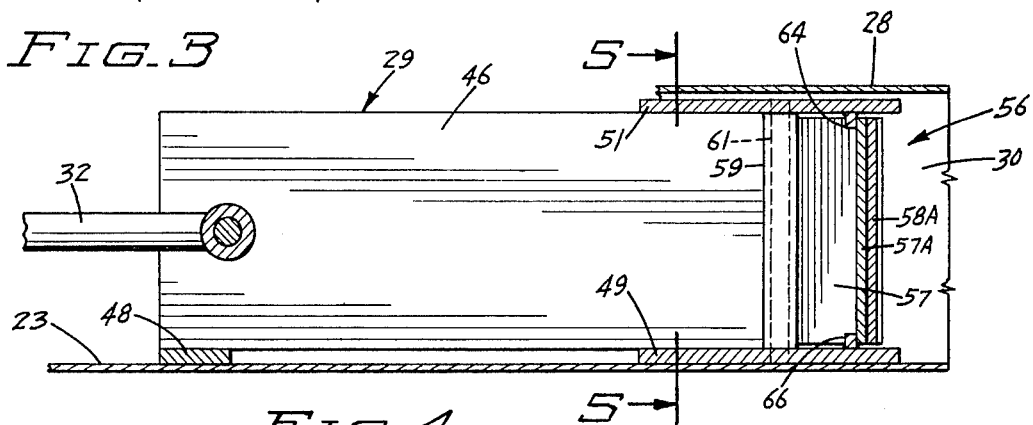
FIG. 4 is a sectional view taken along the line 4—4 of FIG. 3.
Figure 5:
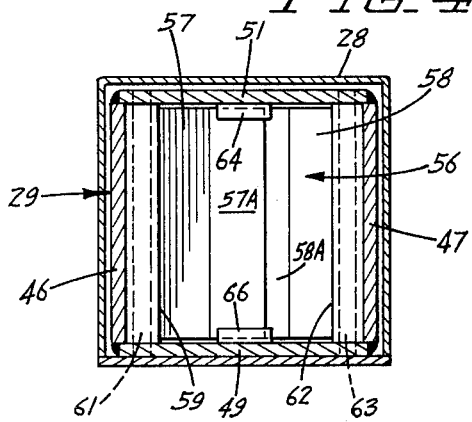
FIG. 5 is a sectional view taken along the line 5—5 of FIG. 4.
Figure 6:
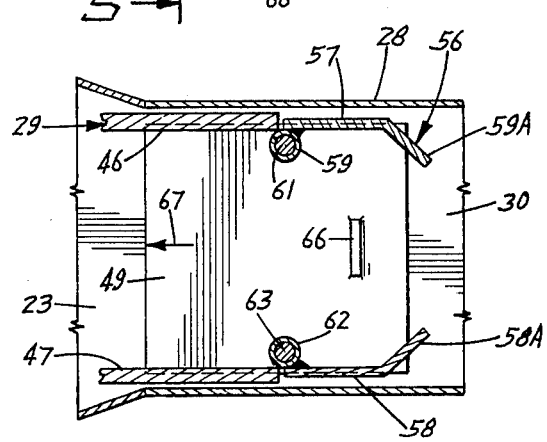
FIG. 6 is a sectional view of the forward end of the pumping piston showing the two doors in the open position.

Referring to FIG. 6, when the pumping piston is moved in the retracted direction, as indicated by arrow 67, the doors 47 and 58 move to their open position in substantial longitudinal alignment with the side walls 46 and 47. The lips 57A and 58A extend in a forward and converging direction whereby the material can flow through the piston 29. On the power stroke movement of the pumping piston 29, the material adjacent the forward side of the lips 57A and 58A will apply a closing force on the doors 57 and 58, thereby quickly moving the doors into engagement with the stops 64 and 66 to a closed position, as shown in FIGS. 3, 4 and 5. For example, with a power stroke of 12 inches, doors 57 and 58 close in the first 3 inches of movement of the piston.

Referring to FIGS. 2, 7 and 8, the fluid motor 31 is carried on an upwardly extended frame assembly indicated generally at 68. Frame assembly 68 has a pair of side frame members 69 and 71 connected together with a top transverse member 72 and top and bottom intermediate transverse member 73 and 74. The fluid motor 31 is located between side members 69 and 71 and extends from the top member 72 between the intermediate members 73 and 74. Fluid motor 31 comprises an elongated cylinder 76 carrying a movable piston 77. A piston rod 78 attached to piston 77 has an end 79 extended in a downward direction. A transverse pin 81 pivotally connects the upper ends of rods 32 and 33 to the end 79.

The cylinder 71 is mounted on a block 82 extended between intermediate members 73 and 74. The block 82 is slightly smaller than the vertical or upright space between the members 73 and 74 leaving a small space 83 between block 82 and the member 73. This space permits fluid motor 31 to have limited up and down movement during its reciprocating operation, thereby eliminating the lateral forces on the block and cylinder.

As shown in FIG. 7, extended upwardly from block 82 are a pair of arms 84 and 86. The arms 84 and 86 are located on opposite sides of cylinder 76 and are pivotally attached to a transverse pin 87. Opposite ends of the pin 87 are secured to the frame members 69 and 71 whereby fluid motor 31 can pivot about the transverse axis of pin 87. The pivotal movement of fluid motor 31 is limited by space 83 shown in FIG. 8.

In use, the electric motor 37 is operated to drive pump 36. Pump 36 delivers the hydraulic fluid under pressure to the reciprocating unit 39 which selectively directs the fluid to the opposite ends of the fluid motor 31. This continuously reciprocates the piston 77 and sequentially drives the rods 32 and 33 in opposite directions. The pumping piston 29 is continuously reciprocated, as indicated by arrows 34, into and out of the square pumping cylinder 29 located at the base of hopper 17. The rear end and top of the piston are open so that any material in the hopper 17 will flow into the piston.

Referring to FIG. 6, when the pumping piston 29 is moved in a rearward or retracted position, as indicated by arrow 67, the double door means 56 are in the open position. Any material in the pumping piston 29 will flow through the piston into the pumping chamber. When the piston reaches its retracted limit, as shown in FIG. 2, it will be moved by the fluid motor 31 in a forward direction. The initial forward movement of the piston will close the doors 57 and 58. The material in front of the piston will engage the lips 57A and 58A and quickly close doors 57 and 58 until they engage stops 64 and 66, as shown in FIG. 5. The fluid motor 31 can have a relatively short stroke as the doors 57 and 58 close on minimal forward movement of piston 29. The material located adjacent the forward end of the piston is forced in a forward direction past the one-way plate valve into the pipe 13. When the pumping piston 29 has completed its forward stroke, it will back up, causing the doors 57 and 58 to move to their open position, as shown in FIG. 6. As soon as the forward pressure of the material in pumping chamber is relieved, the one-way valve member 41 will close, thereby preventing reverse movement of the material in pipe 13. The continued operation of fluid motor 13 will sequentially pump all of the material from the hopper into the pipe 13. The material flows through the pipe 13 into the bottom of the holding pond 12.

While there has been shown and described a preferred embodiment of the invention, is it understood that various changes in the construction and size of the parts of the manure handling system may be made by those skilled in the art without departing from the spirit of the invention.

The embodiments of the invention in which an exclusive property or privilege is claimed are defined as follows:

1. A pumping apparatus for moving material to a selected location comprising: means having a chamber for receiving material and an outlet for carrying material away from the chamber, a pumping piston located in said chamber for moving material into the outlet, said pumping piston having walls forming a passage allowing material to move through the piston, said piston having an open top allowing material to move into the passage, means connected to the pumping piston to reciprocate the piston in a forward direction and a reverse direction, first and second door means movable to closed positions to block the flow of material through the passage on forward movement of the piston and movable to open positions to permit the flow of material through the passage on reverse movement of the piston, separate pivot means pivotally mounting said first and second door means on said piston for movement about separate axes providing for movement of the door means between the closed positions and open positions thereof, and means having stop means secured to the piston engageable with at least one of the door means when the door means are in the closed positions to prevent movement of the door means in a reverse direction beyond the closed positions thereof whereby the door means remain in the closed positions on forward movement of the piston so that the door means moves material in front of the door means through the outlet on movement of the piston in the forward direction and said door means move away from the stop means to open positions on movement of the piston in the reverse direction whereby material can move through the passage of the piston to the outlet.

2. The apparatus of claim 1 wherein: the pumping piston has elongated transversely spaced side walls, said means having stop means including a first plate secured to the forward top portion of the side walls, and a second plate secured to the forward bottom portion of the side walls, said separate pivot means mounted on said first and second plates to pivotally mount the first and second door means on said first and second plates.

3. The apparatus of claim 2 wherein: said stop means are mounted on the first and second plates and engageable with one of the door means when the door means are in the closed positions.

4. The apparatus of claim 1 wherein: each door means has a forwardly and inwardly extended lip.

5. The apparatus of claim 1 wherein: the first and second door means have overlapped portions when the first and second door means are in the closed positions.

6. The apparatus of claim 1 wherein: the means connected to the pumping piston is a double acting hydraulic motor means.

7. The apparatus of claim 6 including: a frame, means pivotally connecting the motor means to the frame, and rod means connecting the hydraulic motor means to the pumping piston.

8. The apparatus of claim 1 wherein: the means connected to the pumping piston includes a double acting hydraulic cylinder, a reciprocating unit connected to the cylinder and a source of hydraulic pressure connected to the reciprocating unit whereby the hydraulic cylinder is continuously reciprocated to continuously reciprocate the pumping piston in a forward direction and a reverse direction.

9. A piston for use with a pumping apparatus for moving material to a selected location comprising: elongated transversely spaced side walls having a forward top portion and a forward bottom portion and a passage through the piston, a first plate secured to the forward top portion of the side walls, a second plate secured to the forward bottom portion of the side walls, first and second door means located between said first and second plates, separate pivot means mounted on said first and second plates to pivotally mount the first and second door means on said plates adjacent said walls for movement about separate axes providing for movement of the first and second door means to closed positions to block the flow of material through the passage and movement of the first and second door means to open positions to permit the movement of material through the passage, and stop means on the first and second plates engageable with one of the door means when said one door means is in its closed position to prevent movement of both door means in a reverse direction beyond the closed positions thereof.

10. The apparatus of claim 9 wherein: each door means has a forwardly and inwardly extended lip.

11. The apparatus of claim 9 wherein: the first and second door means have overlapped portions when the door means are in the closed position.

12. The apparatus of claim 9 wherein: the piston has an open top allowing material to move into the passage.

13. The apparatus of claim 9 wherein: the first and second plates extend forwardly from said side walls and cover said door means when the door means are in the closed position.

14. A pumping apparatus for moving material to a selected location comprising: means having a chamber for receiving material and an outlet for carrying material away from the chamber, a pumping piston located in said chamber for moving material to the outlet, said pumping piston having a passage allowing material to move through the piston, elongated transversely spaced side walls having forward top portions and forward bottom portions, a first plate secured to the forward top portions of the side walls, and a second plate secured to the forward bottom portions of the side walls, means connected to the pumping piston to reciprocate the piston in a forward direction and a reverse direction, first door means and second door means operable to selectively open and close the passage through the piston, separate pivot means mounted on said first and second plates to pivotally mount the first and second door means on said first and second plates for movement about separate axes providing for movement of the door means to closed positions to block the flow of material through the passage and move material through the outlet on movement of the piston in a forward direction and move to open positions on movement of the piston in a reverse direction whereby material can move through the passage of the piston to the outlet, and stop means on the first and second plates engageable with one of the door means when the door means are in the closed positions to prevent movement of said first and second door means in a reverse direction beyond the closed positions thereof.

15. The apparatus of claim 14 wherein: each door means has a forwardly and inwardly extended lip.

16. The apparatus of claim 14 wherein: the first and second door means have overlapped portions when the door means are in the closed positions.

17. The apparatus of claim 14 wherein: the means connected to the pumping piston is a double acting hydraulic motor means.

18. The apparatus of claim 17 including: a frame, means pivotally connecting the frame to the hydraulic motor means, and rod means connecting the hydraulic motor means to the pumping piston.

19. The apparatus of claim 14 wherein: the means connected to the pumping piston to reciprocate the piston includes a double acting hydraulic cylinder and a reciprocating unit connected to the cylinder and a source of hydraulic pressure, said reciprocating unit operable to continuously operate the double acting cylinder and thereby continuously reciprocate the pumping piston in a forward direction and a reverse direction.

20. The apparatus of claim 14 wherein: the pumping piston has an open top between said spaced side walls allowing material to move into the passage between said side walls.

21. A pumping apparatus for moving material to a selected location comprising: means having a chamber for receiving material and an outlet for carrying material away from the chamber, a pumping piston located in the chamber for moving material into the outlet, said pumping piston having elongated transversely spaced side walls and a passage through the piston, said side walls having a forward top portion and a forward bottom portion, a first plate secured to the top forward portion of the side walls and extended in the longitudinal direction of the side walls and a second plate secured to the forward bottom portion of the side walls and extended generally parallel to the first plate, a first door means and a second door means movable to closed positions to block the flow of material through the passage on forward movement of the piston and movable to open positions to permit the flow of material through the passage on reverse movement of the piston, said first and second door means being located between said first plate and second plate, separate pivot means pivotally mounting said first and second door means on said first and second plates for movement about separate axes to provide for movement of the door means between the closed positions and the open positions thereof, stop means on at least one of said first and second plates engageable with one of the door means when the door means are in the closed positions to prevent movement of said first and second door means in a reverse direction beyond the closed positions thereof, and means connected to the pumping piston to reciprocate the piston in a forward direction and a reverse direction whereby the first and second door means move to closed positions on forward movement of the piston and move from the closed positions to the open positions on reverse movement of the door means thereby allowing material to flow through the passage in the piston.

22. The apparatus of claim 21 wherein: the first and second door means have overlapped portions when the first and second door means are in the closed position.

23. The apparatus of claim 21 wherein: each door means has a forwardly and inwardly extended lip.

24. The apparatus of claim 21 wherein: the means connected to the pumping piston is a double acting hydraulic motor.

25. The apparatus of claim 21 wherein: the means connected to the pumping piston includes a double acting hydraulic motor a reciprocating unit connected to the motor, and a source of hydraulic pressure connected to the reciprocating unit whereby the hydraulic cylinder is continuously reciprocated to continuously reciprocate the piston in a forward direction and a reverse direction.

26. The apparatus of claim 21 wherein: the piston has an open top allowing material to move into the passage.

* * * * *

UNITED STATES PATENT AND TRADEMARK OFFICE
CERTIFICATE OF CORRECTION

PATENT NO. : 3,981,635
DATED : September 21, 1976
INVENTOR(S) : Junior M. Hedlund It is certified that error appears in the above-identified patent and that said Letters Patent are hereby corrected as shown below:

Column 4, line 58, "47" should be --57--.

Column 5, line 68, "13" (second occurrence) should be --31--.

Column 6, line 5, "is" (first occurrence) should be --it--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*